(12) United States Patent
Nakajima et al.

(10) Patent No.: US 12,304,852 B2
(45) Date of Patent: May 20, 2025

(54) GLASS ARTICLE AND MANUFACTURING METHOD THEREFOR

(71) Applicant: Nippon Electric Glass Co., Ltd., Shiga (JP)

(72) Inventors: Kazuyoshi Nakajima, Shiga (JP); Hirokazu Tanaka, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 264 days.

(21) Appl. No.: 17/638,971

(22) PCT Filed: Jun. 4, 2020

(86) PCT No.: PCT/JP2020/022110
§ 371 (c)(1),
(2) Date: Feb. 28, 2022

(87) PCT Pub. No.: WO2021/065082
PCT Pub. Date: Apr. 8, 2021

(65) Prior Publication Data
US 2022/0324742 A1    Oct. 13, 2022

(30) Foreign Application Priority Data

Sep. 30, 2019   (JP) ................. 2019-179408

(51) Int. Cl.
*C03B 23/037*     (2006.01)
*B65H 18/28*      (2006.01)
*C03B 35/06*      (2006.01)

(52) U.S. Cl.
CPC .......... *C03B 23/037* (2013.01); *B65H 18/28* (2013.01); *C03B 35/062* (2013.01); *B65H 2301/4127* (2013.01)

(58) Field of Classification Search
CPC ....... C03B 33/00; C03B 23/00; C03B 23/037; B65H 18/28; H01J 2329/08; H01J 29/08; H01J 2329/8635; H01J 2329/89
See application file for complete search history.

(56) References Cited

U.S. PATENT DOCUMENTS

| 6,385,998 B1 * | 5/2002 | Mizuno | ................... | H01J 9/242 65/102 |
| 2002/0123292 A1 * | 9/2002 | Yamazaki | ............... | H01J 9/242 445/24 |

(Continued)

FOREIGN PATENT DOCUMENTS

| JP | 47-36933 | 9/1972 |
| JP | 2000-203857 | 7/2000 |

(Continued)

OTHER PUBLICATIONS

尉磊, The First Office Action for Application No. 202080057743.6, The State Intellectual Property Office of People's Republic of China, Mar. 23, 2024 (Year: 2024).*

(Continued)

*Primary Examiner* — Erin Snelting
*Assistant Examiner* — Steven S Lee
(74) *Attorney, Agent, or Firm* — Wenderoth, Lind & Ponack, L.L.P.

(57) ABSTRACT

Provided is a method of manufacturing a glass article, including: a preparation step of preparing a glass preform (1) including a first thin-walled portion (1a) and a first thick-walled portion (1b) at different positions in a width direction; a forming step of drawing the glass preform (1) downward while heating the glass preform (1) through use of a redraw method, to thereby form a glass ribbon (2) including a second thin-walled portion (2a) and a second thick-walled portion (2b) at different positions in the width (Continued)

direction; and an article formation step of obtaining a glass roll (3) serving as a glass article from the glass ribbon (2).

7 Claims, 7 Drawing Sheets

(56) References Cited

U.S. PATENT DOCUMENTS

| | | | |
|---|---|---|---|
| 2006/0179891 A1* | 8/2006 | Ishikawa | H01J 9/242 |
| | | | 65/435 |
| 2008/0072624 A1* | 3/2008 | Nakagawa | C03C 27/06 |
| | | | 65/106 |
| 2011/0014428 A1* | 1/2011 | Nakamura | C03C 15/02 |
| | | | 65/106 |
| 2011/0059296 A1 | 3/2011 | Wada et al. | |
| 2011/0200805 A1* | 8/2011 | Tomamoto | C03B 23/037 |
| | | | 65/41 |
| 2011/0223386 A1* | 9/2011 | Tomamoto | B65H 18/10 |
| | | | 65/106 |
| 2012/0237779 A1 | 9/2012 | Teranishi et al. | |
| 2014/0318186 A1 | 10/2014 | Wada et al. | |
| 2014/0349076 A1 | 11/2014 | Nakamura | |

FOREIGN PATENT DOCUMENTS

| | | | | | |
|---|---|---|---|---|---|
| JP | 2003317648 | A | * | 11/2003 | C03B 29/14 |
| JP | 2003317651 | A | * | 11/2003 | H01J 29/864 |
| JP | 2003317653 | A | * | 11/2003 | C03B 29/14 |
| JP | 2004241129 | A | * | 8/2004 | |
| JP | 2008-135337 | | | 6/2008 | |
| JP | 2008135337 | A | * | 6/2008 | |
| JP | 2012-188162 | | | 10/2012 | |
| JP | 2015-44742 | | | 3/2015 | |
| WO | WO-03092036 | A1 | * | 11/2003 | H01J 29/864 |
| WO | 2009/119826 | | | 10/2009 | |
| WO | 2011/111625 | | | 9/2011 | |
| WO | WO-2011150149 | A1 | * | 12/2011 | B32B 17/064 |
| WO | 2017/104177 | | | 6/2017 | |
| WO | WO-2018020743 | A1 | * | 2/2018 | C03B 37/083 |

OTHER PUBLICATIONS

Taguchi, Notice of Reasons for Refusal for Application No. 2019-179408, Japan Patent Office, Apr. 4, 2023 (Year: 2023).*
International Preliminary Report on Patentability and Written Opinion of the International Searching Authority issued Apr. 5, 2022 in International (PCT) Application No. PCT/JP2020/022110.
International Search Report issued Aug. 25, 2020 in International (PCT) Application No. PCT/JP2020/022110.

* cited by examiner

GLASS ARTICLE AND MANUFACTURING METHOD THEREFOR

TECHNICAL FIELD

The present invention relates to a glass article and a method of manufacturing the same.

BACKGROUND ART

As is well known, upsizing and thinning of a glass substrate for a flat panel display, such as a liquid crystal display or an OLED display, have been promoted. In view of the foregoing, an overflow down-draw method is widely adopted as a forming method for the glass substrate.

Meanwhile, fora glass sheet to be used in a small device, not only downsizing but also a higher level of thinning than that required for the glass substrate fora flat panel display is required in some cases. In such field, a redraw method is adopted as a forming method for the glass sheet in some cases (for example, Patent Literature 1). The redraw method is a method involving drawing a glass preform while heating the glass preform again, to thereby form an extremely thin elongated glass ribbon.

CITATION LIST

Patent Literature 1: JP 2015-44742 A

SUMMARY OF INVENTION

Technical Problem

The glass sheet, which is downsized and thinned through use of the redraw method, has a problem of having poor handleability in a manufacturing process for a device.

That is, when a support (e.g., fingers of a robot or an operator) is brought into contact with an extremely thin thin-walled portion of the glass sheet, the thin-walled portion may be easily broken. The glass sheet also has a problem in that, when the thin-walled portion of the glass sheet is contaminated by being brought into contact with the support, the contaminant is difficult to remove by washing.

An object of the present invention is to improve the handleability of a glass article comprising a thin-walled portion.

Solution to Problem

According to one embodiment of the present invention, which has been devised to achieve the above-mentioned object, there is provided a method of manufacturing a glass article, comprising: a preparation step of preparing a glass preform comprising a first thin-walled portion and a first thick-walled portion at different positions in a width direction; a forming step of drawing the glass preform downward while heating the glass preform through use of a redraw method, to thereby form a glass ribbon comprising a second thin-walled portion and a second thick-walled portion at different positions in the width direction; and an article formation step of obtaining a glass article from the glass ribbon.

With this configuration, the first thin-walled portion and the first thick-walled portion are formed in advance in the glass preform, and hence the second thin-walled portion and the second thick-walled portion are reliably formed in the glass ribbon having been formed through use of the redraw method. When the glass article (e.g., a glass sheet or a glass roll) is obtained from the glass ribbon, also the glass article is in the state of having the second thin-walled portion and the second thick-walled portion formed therein. Accordingly, the glass article can be handled by supporting the second thick-walled portion having a larger thickness than the second thin-walled portion, and hence the handleability of the glass article becomes satisfactory.

In the above-mentioned configuration, it is preferred that the glass preform comprise the first thin-walled portion at a center portion thereof in the width direction and the first thick-walled portion at each of both end portions thereof in the width direction.

With this configuration, also the glass article obtained from the glass ribbon has the second thin-walled portion formed at a center portion thereof in the width direction and the second thick-walled portion formed at each of both end portions thereof in the width direction. That is, a shape in which the second thin-walled portion is sandwiched between the two second thick-walled portions is achieved, and hence another member is less liable to be brought into contact with the second thin-walled portion, with the result that the handleability of the glass article becomes more satisfactory.

In the above-mentioned configuration, it is preferred that the first thick-walled portion protrude more than the first thin-walled portion on both surfaces of the glass preform in a thickness direction.

With this configuration, also in the glass article obtained from the glass ribbon, the second thick-walled portion protrudes more than the second thin-walled portion on both surfaces of the glass article in the thickness direction, and hence the other member is less liable to be brought into contact with the second thin-walled portion, with the result that the handleability of the glass article becomes more satisfactory.

In the above-mentioned configuration, it is preferred that the first thin-walled portion be formed by grinding or etching the glass preform.

With this configuration, the first thin-walled portion having a smaller thickness than the first thick-walled portion can be easily and reliably formed in the glass preform. In addition, the processing accuracy and surface quality of the first thin-walled portion of the glass preform are improved, and hence there is also an advantage in that the quality of the second thin-walled portion of the glass ribbon or the glass article is stabilized.

In the above-mentioned configuration, the article formation step may comprise taking up the glass ribbon into a roll shape.

With this configuration, a glass roll in which the glass ribbon is taken up into a roll shape is formed as the glass article.

In the above-mentioned configuration, it is preferred that the forming step comprise: arranging a drawing roller, which is configured to draw the glass preform, and is brought into contact with the glass ribbon; and bringing the drawing roller into contact with only the second thick-walled portion of the glass ribbon.

With this configuration, the drawing roller is prevented from being brought into contact with the second thin-walled portion of the glass ribbon, and hence the second thin-walled portion of the glass ribbon or the glass article is less liable to be flawed and contaminated.

In the above-mentioned configuration, it is preferred that the forming step comprise: arranging a support configured to support the glass preform; and bringing the support into contact with only the first thick-walled portion of the glass preform.

With this configuration, the support is prevented from being brought into contact with the first thin-walled portion of the glass preform, and hence the first thin-walled portion of the glass preform is less liable to be flawed and contaminated. That is, the second thin-walled portion of the glass ribbon or the glass article obtained from the glass preform is less liable to be flawed and contaminated.

In the above-mentioned configuration, it is preferred that a ratio of (a thickness of the first thick-walled portion)/(a thickness of the first thin-walled portion) be from 1.1 to 25.

With this configuration, the glass article excellent in dimensional accuracy can be stably obtained.

In the above-mentioned configuration, it is preferred that a ratio of (a total width of the glass preform)/(a thickness of the first thick-walled portion) be from 25 to 4,000.

With this configuration, the glass article excellent in dimensional accuracy can be stably obtained.

In the above-mentioned configuration, it is preferred that a ratio of (a width of the first thick-walled portion)/(a width of the first thin-walled portion) be from 0.02 to 40,000.

With this configuration, the glass article excellent in dimensional accuracy can be stably obtained.

According to one embodiment of the present invention, which has been devised to achieve the above-mentioned object, there is provided a glass article, comprising a thin-walled portion and a thick-walled portion at different positions in a width direction, wherein a thickness of the thick-walled portion is 1.1 times or more as large as a thickness of the thin-walled portion, and wherein surfaces of the thin-walled portion and the thick-walled portion are each formed of a fire-polished surface.

With this configuration, the glass article can be handled by supporting the thick-walled portion having a larger thickness than the thin-walled portion, and hence the handleability of the glass article becomes satisfactory. In addition, when the surfaces of the thin-walled portion and the thick-walled portion are each formed of the fire-polished surface, a defect (e.g., microcracks) that causes breakage is less liable to be formed. Besides, in the course in which the fire-polished surface is formed, a corner portion formed on the surface is rounded. Accordingly, the strength of the glass article is increased.

In the above-mentioned configuration, it is preferred that the glass article have the thin-walled portion formed at a center portion thereof in the width direction and the thick-walled portion formed at each of both end portions thereof in the width direction, and the surface of the thin-walled portion be formed of a flat surface and/or a concave curved surface.

With this configuration, the thick-walled portion is formed on each of both sides of the thin-walled portion in the width direction, and hence another member is less liable to be brought into contact with the thin-walled portion, with the result that the handleability of the glass article becomes more satisfactory. In addition, the surface of the thin-walled portion is formed of the flat surface and/or the concave curved surface, and hence also the strength of the thin-walled portion is easily ensured.

In the above-mentioned configuration, it is preferred that the thick-walled portion protrude more than the thin-walled portion on both surfaces of the glass article in a thickness direction.

With this configuration, the other member is less liable to be brought into contact with the thin-walled portion, with the result that the handleability of the glass article becomes more satisfactory.

In the above-mentioned configuration, it is preferred that a ratio of (a total width of the glass article)/(the thickness of the thick-walled portion) be from 1.1 to 25.

In the above-mentioned configuration, it is preferred that a ratio of (a width of the thick-walled portion)/(a width of the thin-walled portion) be from 0.02 to 40,000.

In the above-mentioned configuration, it is preferred that the thickness of the thin-walled portion be 10 µm or less, and a total width of the glass article (the maximum width of the glass article) be from 0.5 mm to 40 mm.

In the above-mentioned configuration, the glass article may be a glass roll in which a glass ribbon comprising the thick-walled portion and the thin-walled portion is taken up into a roll shape.

In the case of the glass roll, it is preferred that the glass article have a protective sheet interposed between the glass ribbons facing each other in a radial direction, and the protective sheet be brought into contact with only the thick-walled portion on at least one surface of each of the glass ribbons in a thickness direction.

With this configuration, the protective sheet is prevented from being brought into contact with the thin-walled portion on the at least one surface of each of the glass ribbons in the thickness direction, and hence the thin-walled portion can be suppressed from being flawed and contaminated by being brought into contact with the protective sheet.

Advantageous Effects of Invention

According to the present invention, the handleability of the glass article comprising a thin-walled portion can be improved.

DESCRIPTION OF EMBODIMENTS

Figure 1:
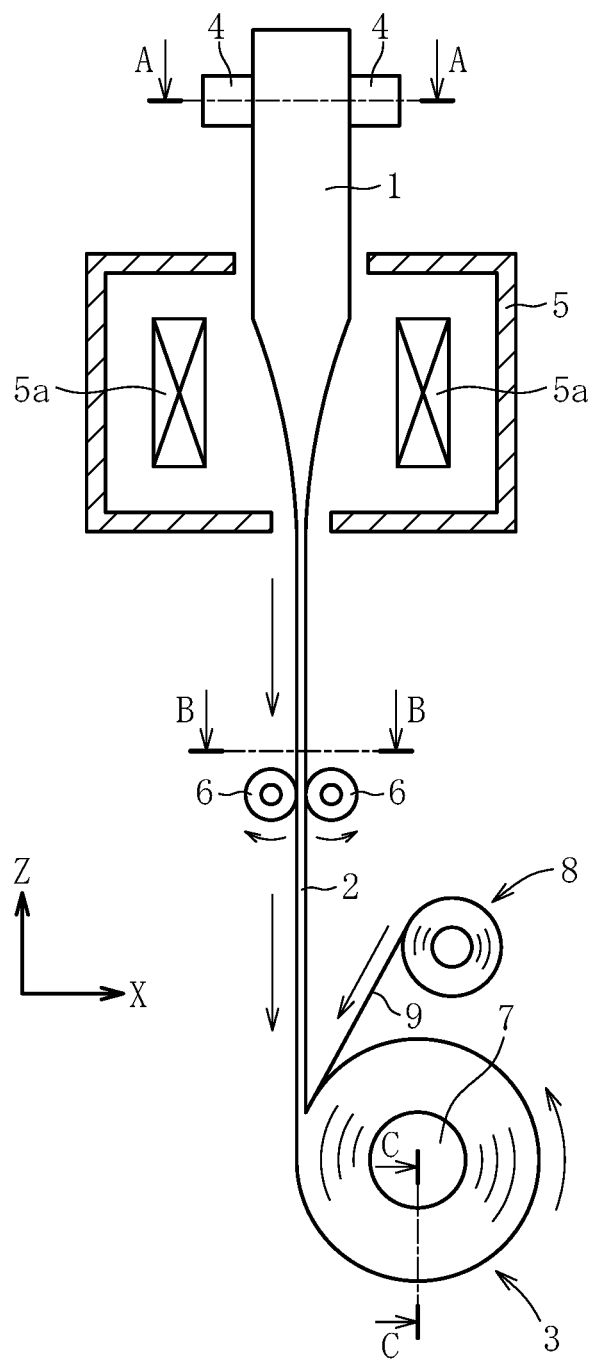
FIG. 1 is a side view for illustrating a method of manufacturing a glass article according to a first embodiment.

Now, a glass article and a method of manufacturing the same according to embodiments of the present invention are described with reference to the drawings. The items X, Y, and Z in the drawings form an orthogonal coordinate system. The X direction and the Y direction are horizontal directions, and the Z direction is a vertical direction.

First Embodiment

Figure 2:
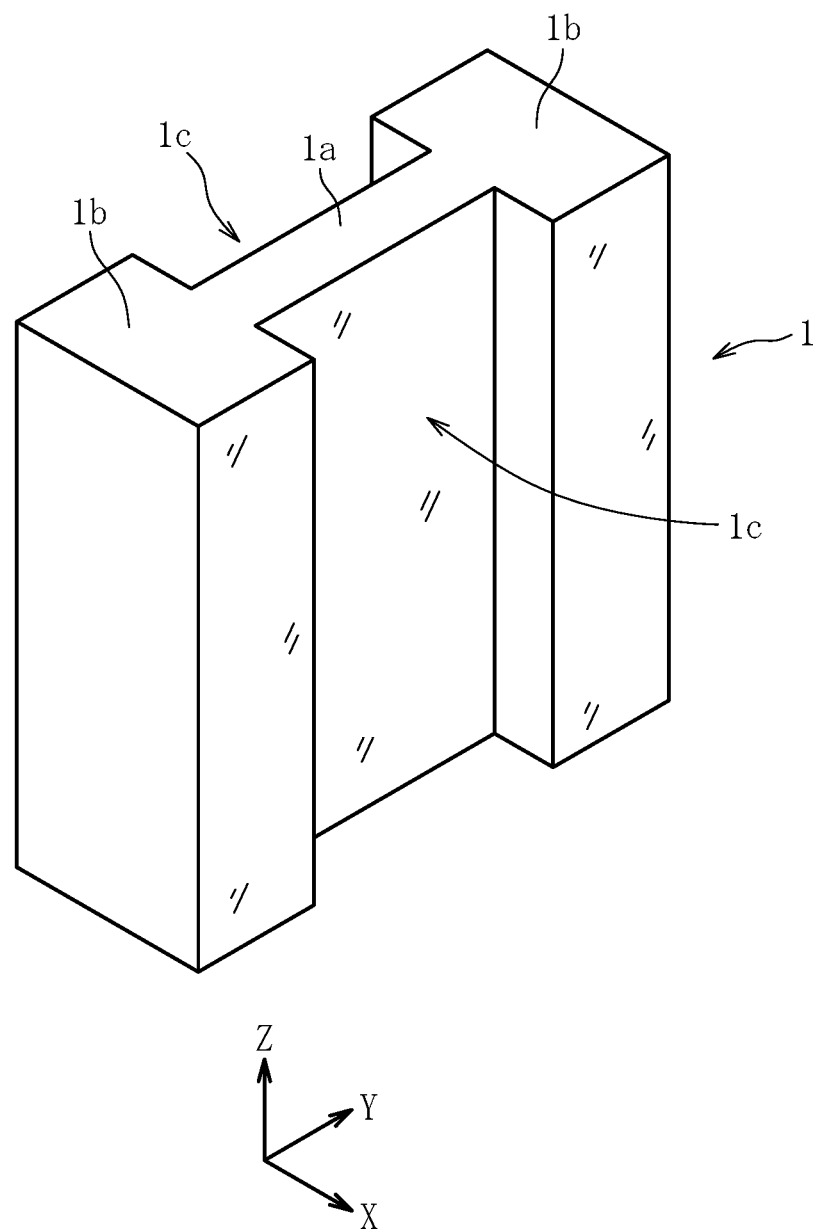
FIG. 2 is a perspective view for illustrating a glass preform of FIG. 1.
Figure 3:
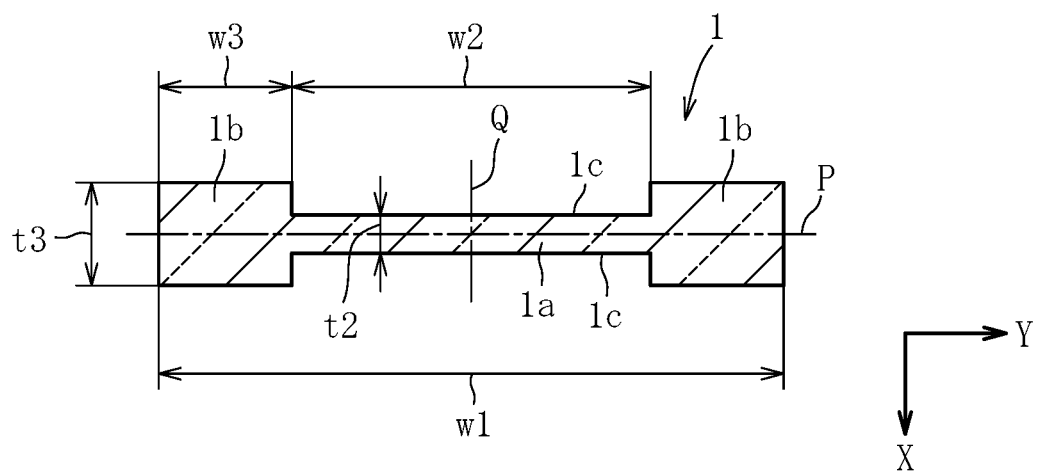
FIG. 3 is a sectional view for illustrating the glass preform of FIG. 1.

As illustrated in FIG. 1 to FIG. 3, a method of manufacturing a glass article according to a first embodiment comprises: a preparation step of preparing a glass preform 1 (see FIG. 2 and FIG. 3); a forming step of drawing the glass preform 1 downward while heating the glass preform 1 through use of a redraw method, to thereby form a glass ribbon 2 (see FIG. 1); and an article formation step of obtaining a glass roll 3 serving as a glass article from the glass ribbon 2 (see FIG. 1).

As illustrated in FIG. 2 and FIG. 3, the glass preform 1 comprising a first thin-walled portion 1a and a first thick-walled portion 1b at different positions in a width direction (Y direction) is prepared in the preparation step.

Specifically, the glass preform 1 comprises the first thin-walled portion 1a at a center portion thereof in the width direction and the first thick-walled portion 1b at each of both end portions thereof in the width direction. In this embodiment, the first thin-walled portion 1a and the first thick-walled portion 1b each comprise a flat surface portion having a constant thickness.

Further, the first thick-walled portion 1b protrudes more than the first thin-walled portion 1a on both surfaces of the glass preform 1 in a thickness direction (X direction). In other words, the glass preform 1 has a recessed portion 1c formed at a position corresponding to the first thin-walled portion 1a on both the surfaces thereof in the thickness direction.

In this embodiment, a cross section of the glass preform 1 in an XY plane is axisymmetric with respect to each of a thickness-direction center line P passing through the center in the thickness direction and a width-direction center line Q passing through the center in the width direction. As a matter of course, the sectional shape of the glass preform 1 is not limited to the case of having such symmetry.

The first thin-walled portion 1a (recessed portion 1c) is formed by, for example, grinding or etching the glass preform 1 that forms a rectangular body. In particular, in the case of etching, it is preferred to adopt a method involving producing a mask by photolithography or the like on a main surface of the glass preform 1 that forms a rectangular body before the first thin-walled portion 1a (recessed portion 1c) is formed therein, and obtaining the desired first thin-walled portion 1a by wet etching or dry etching. The glass preform 1 that forms a rectangular body before the first thin-walled portion 1a is formed therein may be formed by, for example, a down-draw method, such as an overflow down-draw method, a slot down-draw method, or a redraw method, or a float method. For example, alkali-free glass (e.g., Type-D manufactured by Nippon Electric Glass Co., Ltd.) may be utilized as the glass preform 1. A formation method for the first thin-walled portion 1a of the glass preform 1 is not particularly limited, and any other method, such as molding with a die, may also be utilized.

As illustrated in FIG. 1, in the forming step, while an upper end portion of the glass preform 1 is supported by a support 4, the glass preform 1 is supplied to an inside of a heating furnace 5 by lowering the support 4. The glass preform 1 is heated with a heater 5a to be softened in the inside of the heating furnace 5. A pair of drawing rollers 6 to be brought into contact with both surfaces of the glass ribbon 2, which follows the glass preform 1 having been softened, is arranged below the heating furnace 5. The glass preform 1 having been softened is drawn by pulling the glass ribbon 2 downward by the pair of drawing rollers 6. In this manner, the glass ribbon 2 having a small thickness is formed from the glass preform 1.

Figure 4:
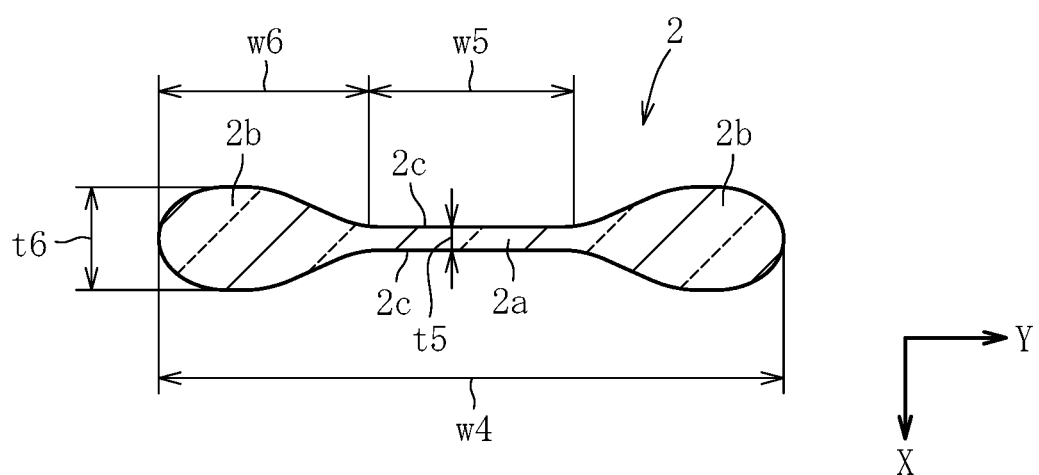
FIG. 4 is a sectional view for illustrating a glass ribbon of FIG. 1.

As illustrated in FIG. 4, the glass ribbon 2 comprises a second thin-walled portion 2a corresponding to the first thin-walled portion 1a of the glass preform 1 and a second thick-walled portion 2b corresponding to the first thick-walled portion 1b of the glass preform 1. That is, the glass ribbon 2 comprises the second thin-walled portion 2a at a center portion thereof in the width direction and the second thick-walled portion 2b at each of both end portions thereof in the width direction. While the surface of the second thin-walled portion 2a is formed of a flat surface extending along the width direction in the illustrated example, the surface of the second thin-walled portion 2a may be formed, for example, of a concave curved surface, or of a flat surface and a concave curved surface. Further, the second thick-walled portion 2b protrudes more than the second thin-walled portion 2a on both the surfaces of the glass ribbon 2 in the thickness direction. In other words, the glass ribbon 2 has a recessed portion 2c formed at a position corresponding to the second thin-walled portion 2a on both the surfaces thereof in the thickness direction. The glass preform 1 is drawn so that a thickness t5 of the second thin-walled portion 2a of the glass ribbon 2 is, for example, from 1 μm to 50 μm (preferably from 1 μm to 30 μm).

Figure 5:
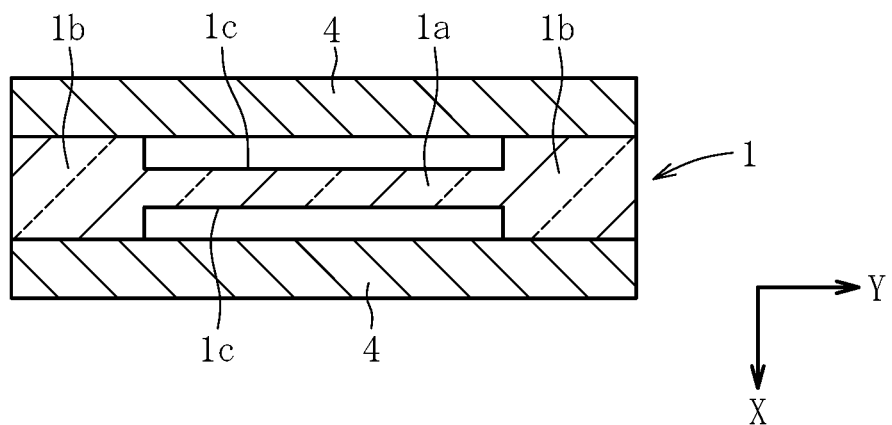
FIG. 5 is a sectional view taken along the line A-A of FIG. 1.
Figure 6:
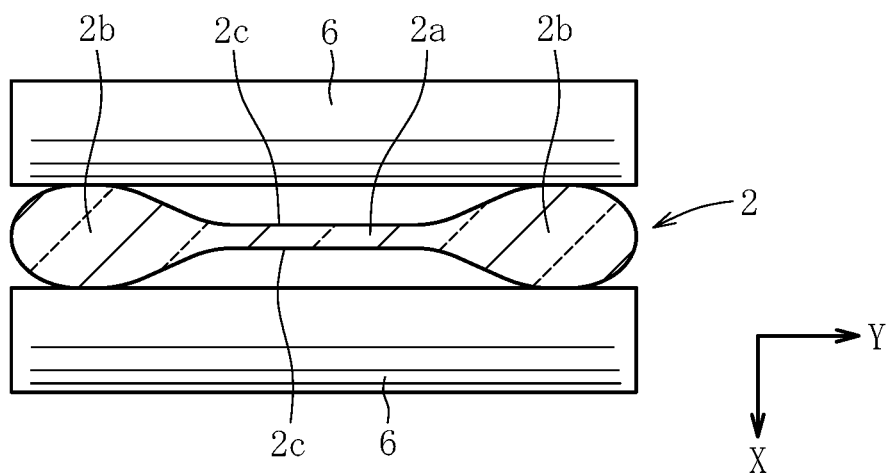
FIG. 6 is a sectional view taken along the line B-B of FIG. 1.

As illustrated in FIG. 5, the support 4 has a support surface formed of a flat surface, and is brought into contact with only the first thick-walled portion 1b out of the glass preform 1 without being brought into contact with the first thin-walled portion 1a. In addition, as illustrated in FIG. 6, the pair of drawing rollers 6 is formed of rod-shaped rollers each having a constant diameter, and is brought into contact with only the second thick-walled portion 2b out of the glass ribbon 2 without being brought into contact with the second thin-walled portion 2a. Accordingly, the first thin-walled portion 1a of the glass preform 1 and the second thin-walled portion 2a of the glass ribbon 2 can be suppressed from being flawed and contaminated. The support 4 and/or the drawing rollers 6 may be brought into contact with the thin-walled portions 1a and 2a.

As illustrated in FIG. 3, a ratio of (a thickness t3 of the first thick-walled portion 1b of the glass preform 1)/(a thickness t2 of the first thin-walled portion 1a of the glass preform 1) is preferably from 1.1 to 25, more preferably from 1.5 to 12.5, still more preferably from 2 to 12.5, most preferably from 2 to 5.

A ratio of (a total width w1 of the glass preform 1)/(the thickness t3 of the first thick-walled portion 1b of the glass preform 1) is preferably from 25 to 4,000, more preferably from 500 to 3,000.

A ratio of (a width w3 of the first thick-walled portion 1b of the glass preform 1)/(a width w2 of the first thin-walled portion 1a of the glass preform 1) is preferably from 0.02 to 40,000.

As illustrated in FIG. 4, a ratio of (the thickness t6 of the second thick-walled portion 2b of the glass ribbon 2)/(a thickness t5 of the second thin-walled portion 2a of the glass ribbon 2) is preferably 1.1 or more, more preferably from 1.5 to 12.5, still more preferably from 2 to 12.5, most preferably from 2 to 5.

A ratio of (a total width w4 of the glass ribbon 2)/(the thickness t6 of the second thick-walled portion 2b of the glass ribbon 2) is preferably from 1.1 to 25, more preferably from 1.5 to 12.5, most preferably from 2 to 5.

A ratio of (a width w6 of the second thick-walled portion 2b of the glass ribbon 2)/(a width w5 of the second thin-walled portion 2a of the glass ribbon 2) is preferably from 0.02 to 40,000.

The thickness t5 of the second thin-walled portion 2a of the glass ribbon 2 is preferably 10 µm or less, and the total width w4 of the glass ribbon 2 (the maximum width of the glass article) is preferably from 0.5 mm to 40 mm.

The surface of the glass ribbon 2 is formed of a fire-polished surface. That is, the surfaces of the second thin-walled portion 2a and the second thick-walled portion 2b are each formed of a fire-polished surface. Herein, the "fire-polished surface" means an unpolished surface that is solidified without having been brought into contact with another member, such as a roller, after glass is melted. When such fire-polished surface is formed, a defect (e.g., microcracks) that causes breakage is less liable to be formed. Besides, a corner portion formed on the surface is rounded in the course of melting and is in a chamfered-like state. Accordingly, when the fire-polished surface is formed, the strength (particularly bending strength) of the glass ribbon 2 is increased.

Figure 7:
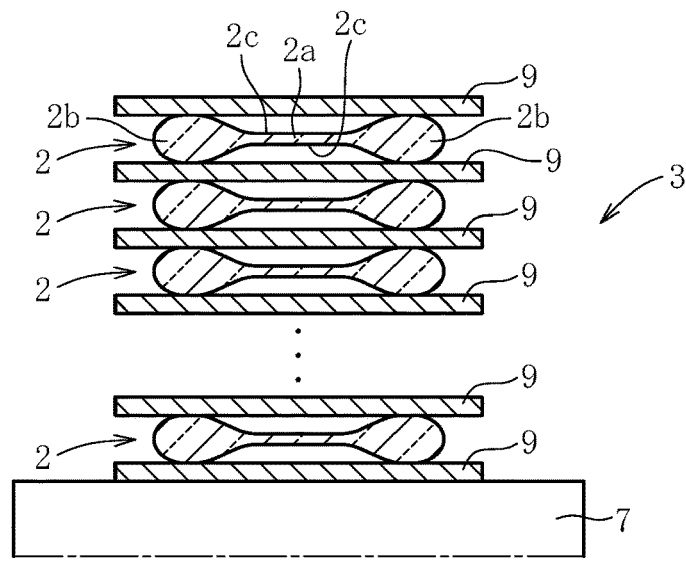
FIG. 7 is a sectional view taken along the line C-C of FIG. 1.

As illustrated in FIG. 1, in the article formation step, the glass roll 3 serving as a glass article is formed by taking up the glass ribbon 2 into a roll shape around a take-up roller 7 serving as a winding core. In this embodiment, a protective sheet roll 8 is arranged in the vicinity of the take-up roller 7. A protective sheet 9 having been unwound from the protective sheet roll 8 is superimposed on the glass ribbon 2, and is taken up around the take-up roller 7 together with the glass ribbon 2. That is, as illustrated in FIG. 7, the glass ribbon 2 and the protective sheet 9 are alternately laminated on each other in a radial direction of the glass roll 3. From the viewpoint of suppressing the glass ribbon 2 from being flawed and contaminated, the innermost layer and outermost layer of the glass roll 3 are each preferably formed of the protective sheet 9.

The glass ribbon 2 comprises the second thin-walled portion 2a at the center portion thereof in the width direction and the second thick-walled portion 2b at each of both the end portions thereof in the width direction, and has the recessed portion 2c formed at a position corresponding to the second thin-walled portion 2a on both the surfaces thereof in the thickness direction. Accordingly, the protective sheet 9 is brought into contact with only the second thick-walled portion 2b of the glass ribbon 2 without being brought into contact with the second thin-walled portion 2a on both the surfaces of the glass ribbon 2 in the thickness direction. As a result, both surfaces of the second thin-walled portion 2a of the glass ribbon 2 in the thickness direction can be suppressed from being flawed and contaminated by being brought into contact with the protective sheet 9. The protective sheet 9 may be brought into contact with the second thin-walled portion 2a. For example, when the recessed portion 2c is formed at a position corresponding to the second thin-walled portion 2a on only one surface of the glass ribbon 2 in the thickness direction, the protective sheet 9 is brought into contact with the second thin-walled portion 2a on the other surface (a surface on a side in which the recessed portion 2c is not formed) of the glass ribbon 2 in the thickness direction.

The glass ribbon 2 included in the glass roll 3 is cut into a predetermined length to provide a glass sheet, which is incorporated in a device. The glass ribbon 2 or the glass sheet comprises the second thin-walled portion 2a and the second thick-walled portion 2b having shapes in conformity with those of the glass preform 1, and hence the glass ribbon 2 or the glass sheet can be handled by supporting the second thick-walled portion 2b having a larger thickness than the second thin-walled portion 2a in a manufacturing process for the device. Accordingly, the handleability of the glass ribbon 2 or the glass sheet becomes satisfactory. It is appropriate that the second thick-walled portion 2b be removed by cutting after a predetermined step in the manufacturing process for the device, and only the second thin-walled portion 2a be incorporated in the device. Alternatively, it is appropriate that the second thick-walled portion 2b be incorporated in the device together with the second thin-walled portion 2a without removing the second thick-walled portion 2b by cutting in the manufacturing process for the device. The second thick-walled portion 2b may be easily removed by splitting by, for example, applying a bending stress thereto.

Examples of the device to which the glass ribbon 2 included in the glass roll 3 is applied include a diaphragm device, a biofilter, a nanopore sensor, a prepared slide, and other sample containers and sample covers.

The diaphragm device is a device for controlling a fluid through utilization of deformation of a diaphragm. The glass sheet obtained by cutting the glass ribbon 2 is utilized as the diaphragm. Typical examples of the diaphragm device include a diaphragm valve for opening and closing a flow passage with the diaphragm, and a diaphragm pump for pumping a fluid with the diaphragm.

The biofilter and the nanopore sensor are each a device for selectively extracting a specific fine material, such as DNA or a protein, from a test object. The biofilter comprises a filter portion for selectively extracting a specific fine material (e.g., an exosome derived from a cancer) from a test object (e.g., blood), and the glass sheet obtained by cutting the glass ribbon 2 is utilized as the filter portion. The nanopore sensor further comprises, in addition to the filter portion, a sensor for detecting (or detecting and analyzing) the fine material having been selectively extracted. Fine pores are formed in the glass sheet utilized as the filter portion. The fine pores of the glass sheet are each a circular opening having a diameter of, for example, from 1 µm to 50 µm in the case of the biofilter, and are each a circular opening having a diameter of, for example, from 100 nm to 1,000 nm in the case of the nanopore sensor. The fine pores may be formed under the state of the glass ribbon 2, or may be formed under the state of the glass sheet obtained by cutting the glass ribbon 2. A processing method for the fine pores is not particularly limited, but for example, mechanical processing with a drill or the like, laser processing, ultrasonic processing, or ion beam (FIB) processing may be utilized. When the fine pores each have a nanometer size, the FIB processing is preferably utilized.

Second Embodiment

Figure 8:
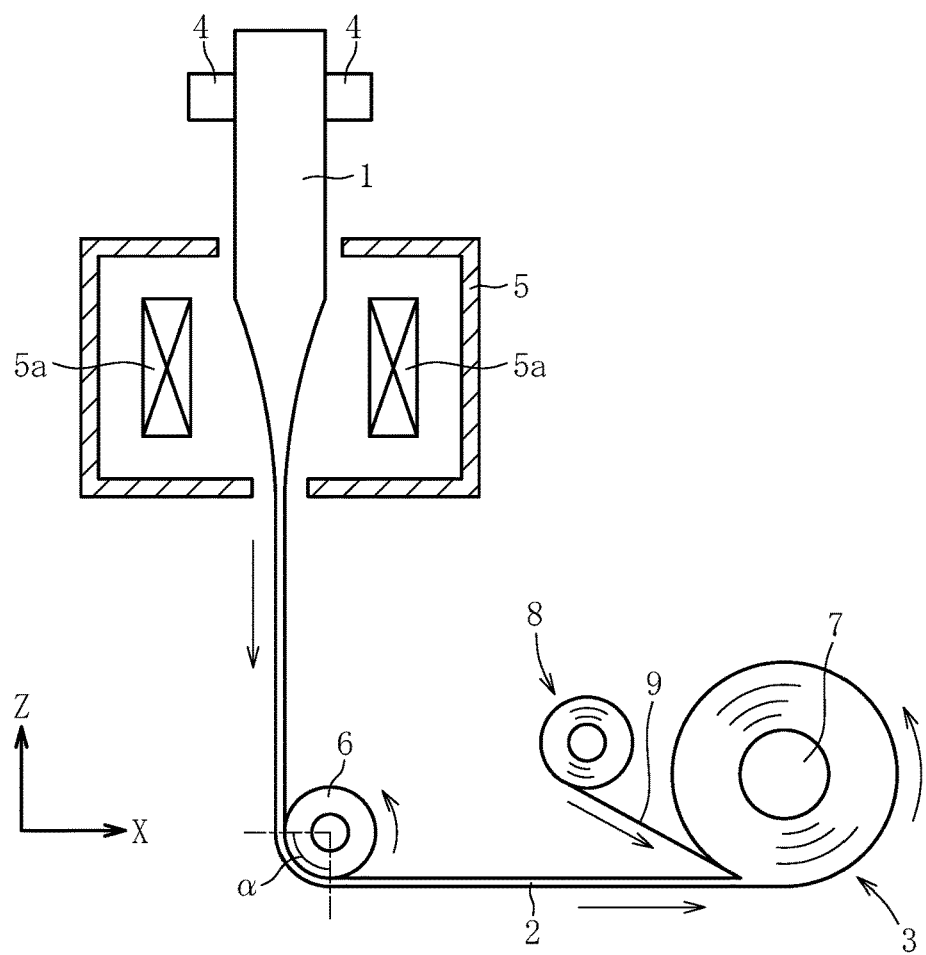
FIG. 8 is a side view for illustrating a method of manufacturing a glass article according to a second embodiment.

As illustrated in FIG. 8, a method of manufacturing a glass article according to a second embodiment differs from the method of manufacturing a glass article according to the first embodiment in that the drawing roller 6 is arranged on only one surface side of the glass ribbon 2, which follows the glass preform 1.

That is, the glass ribbon 2 is wound on a partial region of an outer peripheral surface of the one drawing roller 6 in a circumferential direction, and the posture of the glass ribbon 2 is changed from a vertical posture (e.g., a longitudinal posture) to a lateral posture (e.g., a horizontal posture). In the course of such posture change, the glass preform 1 having been softened in the inside of the heating furnace 5 is drawn by pulling the glass ribbon 2 downward by the one drawing roller 6. In this manner, the glass ribbon 2 having a small thickness is formed from the glass preform 1.

The drawing roller 6 has a holding angle α of preferably 90 degrees or more, more preferably from 90 degrees to 225 degrees.

Other configurations in this embodiment are the same as those in the first embodiment. In this embodiment, the components common to the first embodiment are denoted by the same reference symbols as those in the first embodiment.

The present invention is not limited to the configurations of the above-mentioned embodiments. In addition, the action and effect of the present invention are not limited to those described above. The present invention may be modified in various forms within the range not departing from the spirit of the present invention.

While the case in which the glass article is the glass roll 3 has been given as an example in each of the above-mentioned embodiments, the glass article may be a glass sheet obtained by cutting the glass ribbon 2 into a predetermined length on a downstream side of the drawing roller 6. Also when the glass article is the glass sheet, the same manufacturing steps as those given as examples in each of the above-mentioned embodiments may be applied.

While the case in which the glass preform 1 and the glass ribbon 2 (or the glass article) comprise the thin-walled portions 1a and 2a, respectively, at the center portions thereof in the width direction and the thick-walled portions 1b and 2b, respectively, at each of both the end portions thereof in the width direction, and the thick-walled portions 1b and 2b protrude more than the thin-walled portions 1a and 2a, respectively, at symmetric positions to each other on both the surfaces of the glass preform 1 and the glass ribbon 2 in the thickness direction has been described in each of the above-mentioned embodiments, the shapes of the glass preform 1 and the glass ribbon 2 are not limited thereto. That is, the glass ribbon 2 (or the glass article) can be formed into various shapes in conformity with the shape of the glass preform 1 by changing the position and size of the first thick-walled portion 1b or the first thin-walled portion 1a of the glass preform 1. Modified examples of the glass preform 1 and the glass ribbon 2 are given below.

Figure 9:
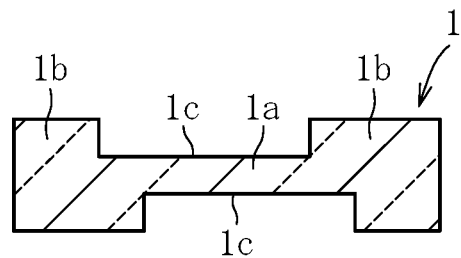
FIG. 9 is a sectional view for illustrating a modified example of the glass preform.

As illustrated in FIG. 9, it is appropriate that the glass preform 1 comprise the first thin-walled portion 1a at the center portion thereof in the width direction and the first thick-walled portion 1b at each of both the end portions thereof in the width direction, and the first thick-walled portion 1b protrude more than the first thin-walled portion 1a at different positions from each other on both the surfaces of the glass preform 1 in the thickness direction. In other words, the positions of the recessed portion 1c in the width direction may slightly differ from each other on both the surfaces of the glass preform 1 in the thickness direction. However, when the sectional shape of the glass preform 1 is not axisymmetric with respect to the thickness-direction center line passing through the center in the thickness direction or the width-direction center line passing through the center in the width direction, the glass ribbon 2 may be warped in the course of forming. Accordingly, the sectional shape of the glass preform 1 is preferably axisymmetric with respect to at least one of the thickness-direction center line passing through the center in the thickness direction or the width-direction center line passing through the center in the width direction.

Figure 10:
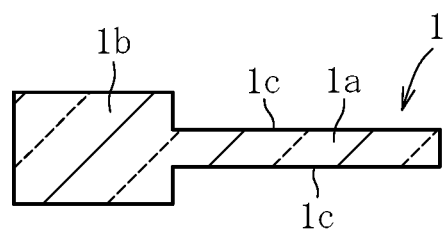
FIG. 10 is a sectional view for illustrating a modified example of the glass preform.

As illustrated in FIG. 10, it is appropriate that the glass preform 1 comprise the first thick-walled portion 1b at only one end portion thereof in the width direction and the first thin-walled portion 1a at the residual portion in the width direction, and the first thick-walled portion 1b protrude more than the first thin-walled portion 1a at symmetric positions to each other on both the surfaces of the glass preform 1 in the thickness direction.

Figure 11:
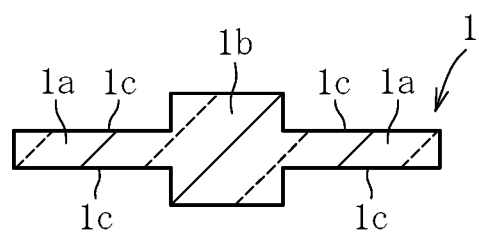
FIG. 11 is a sectional view for illustrating a modified example of the glass preform.

As illustrated in FIG. 11, it is appropriate that the glass preform 1 comprise the first thick-walled portion 1b at the center portion thereof in the width direction and the first thin-walled portion 1a at each of both the end portions thereof in the width direction, and the first thick-walled portion 1b protrude more than the first thin-walled portion 1a at symmetric positions to each other on both the surfaces of the glass preform 1 in the thickness direction.

Figure 12:
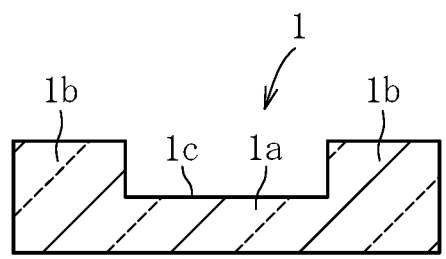
FIG. 12 is a sectional view for illustrating a modified example of the glass preform.

As illustrated in FIG. 12, it is appropriate that the glass preform 1 comprise the first thin-walled portion 1a at the center portion thereof in the width direction and the first thick-walled portion 1b at each of both the end portions thereof in the width direction, and the first thick-walled portion 1b protrude more than the first thin-walled portion 1a on only one surface of the glass preform 1 in the thickness direction. In other words, the recessed portion 1c may be formed on only one surface of the glass preform 1 in the thickness direction.

Figure 13:
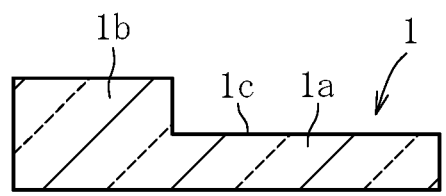
FIG. 13 is a sectional view for illustrating a modified example of the glass preform.

As illustrated in FIG. 13, it is appropriate that the glass preform 1 comprise the first thick-walled portion 1b at only one end portion thereof in the width direction and the first thin-walled portion 1a at the residual portion in the width direction, and the first thick-walled portion 1b protrude more than the first thin-walled portion 1a on only one surface of the glass preform 1 in the thickness direction.

Figure 14:
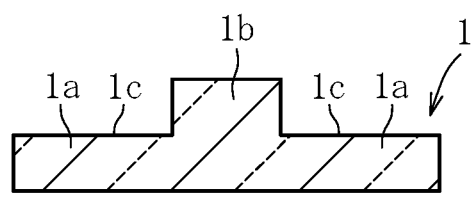
FIG. 14 is a sectional view for illustrating a modified example of the glass preform.

As illustrated in FIG. 14, it is appropriate that the glass preform 1 comprise the first thick-walled portion 1b at the center portion thereof in the width direction and the first thin-walled portion 1a at each of both the end portions thereof in the width direction, and the first thick-walled portion 1b protrude more than the first thin-walled portion 1a on only one surface of the glass preform 1 in the thickness direction.

REFERENCE SIGNS LIST

1 glass preform
1a first thin-walled portion
1b first thick-walled portion
1c recessed portion
2 glass ribbon
2a second thin-walled portion
2b second thick-walled portion
2c recessed portion
3 glass roll
4 support
5 heating furnace
6 drawing roller
7 take-up roller
8 protective sheet roll
9 protective sheet

The invention claimed is:

1. A method of manufacturing a glass article, the method comprising:
a preparation step of preparing a glass preform comprising a first thin-walled portion at a center portion of the glass preform in a width direction and a first thick-walled portion thicker than the first thin-walled portion only at each of both end portions of the glass preform in the width direction;
a forming step of drawing the glass preform downward while heating and softening the glass preform through use of a redraw method, to thereby form a glass ribbon comprising a second thin-walled portion having a thickness of 10 μm or less at a center portion of the glass ribbon in a width direction and a second thick-walled portion thicker than the second thin-walled portion only at each of both end portions of the glass ribbon in the width direction; and
an article formation step of obtaining a glass article from the glass ribbon,
wherein the forming step comprises: arranging a drawing roller, which is configured to draw the glass preform; and bringing the drawing roller into contact with only the second thick-walled portion of the glass ribbon,
wherein the article formation step comprises superimposing a protective sheet on the glass ribbon, and taking up the protective sheet and the glass ribbon into a roll shape, and
wherein, in the roll shape, the protective sheet covers an entire width of the glass ribbon including the second thin-walled portion and the second thick-walled portion and the protective sheet extends beyond an outer edge of the second thick-walled portion.

2. The method of manufacturing a glass article according to claim 1, wherein the first thick-walled portion protrudes more than the first thin-walled portion on both surfaces of the glass preform in a thickness direction.

3. The method of manufacturing a glass article according to claim 1, wherein the first thin-walled portion is formed by grinding or etching the glass preform.

4. The method of manufacturing a glass article according to claim 1, wherein the forming step further comprises: arranging a support configured to support the glass preform; and bringing the support into contact with only the first thick-walled portion of the glass preform.

5. The method of manufacturing a glass article according to claim 1, wherein a ratio of (a thickness of the first thick-walled portion)/(a thickness of the first thin-walled portion) is from 1.1 to 25.

6. The method of manufacturing a glass article according to claim 1, wherein a ratio of (a total width of the glass preform)/(a thickness of the first thick-walled portion) is from 25 to 4,000.

7. The method of manufacturing a glass article according to claim 1, wherein a ratio of (a width of the first thick-walled portion)/(a width of the first thin-walled portion) is from 0.02 to 40,000.

* * * * *